United States Patent [19]

Moritz

[11] 3,848,407
[45] Nov. 19, 1974

[54] LINK STRUCTURE FOR CHAINS FOR SUPPORTING AND GUIDING ENERGY CONVEYING CONDUCTORS

[75] Inventor: Werner Moritz, Siegen, Germany

[73] Assignee: Kobelschlepp Gesellschaft mit beschrankter Haftung, Siegen, Germany

[22] Filed: Oct. 24, 1973

[21] Appl. No.: 409,238

[30] Foreign Application Priority Data
Nov. 11, 1972 Germany............................ 2255283

[52] U.S. Cl.................. 59/78.1, 74/251 C, 248/49, 248/51, 248/68 R
[51] Int. Cl............................................ F16g 13/00
[58] Field of Search ....... 59/78.1; 248/49, 51, 68 R; 198/189; 74/245 R, 245 C, 251 C

[56] References Cited
UNITED STATES PATENTS

| | | | |
|---|---|---|---|
| 2,864,907 | 12/1958 | Waninger............................ | 248/49 |
| 3,157,376 | 11/1964 | Merker et al......................... | 248/49 |
| 3,382,668 | 5/1968 | Berkes et al.......................... | 59/78.1 |
| 3,566,603 | 3/1971 | Chadwick............................ | 59/78.1 |
| 3,782,670 | 1/1974 | Kielma................................ | 248/68 R |

*Primary Examiner*—Samuel Scott
*Assistant Examiner*—Allan Russell Burke
*Attorney, Agent, or Firm*—Walter Becker

[57] ABSTRACT

A link structure for use in chains for supporting and guiding energy conductors such as cables and hoses from a fixed point to a movable consumer, which comprises two links substantially parallel to each other and having a web arranged therebetween and connected thereto. This web has at least two traverses arranged in substantially parallelly spaced relationship to each other. Each of these traverses has a cross section with two oppositely located rounded sections forming part of a circle and with two oppositely located straight sides so that the maximum distance between the rounded sections is considerably greater than the distance between the oppositely located straight sides. These traverses are respectively located in upper and lower undercut rounded cutouts provided in the upper and lower end portions of spacer webs located between the two links and are spaced from each other in the longitudinal direction of the traverses. These cutouts conform in cross section to the rounded sections of the traverses so that the traverses in one position are vertically non-removable from the cutouts of the spacer webs and in another position can be removed vertically from the spacer webs.

9 Claims, 5 Drawing Figures

LINK STRUCTURE FOR CHAINS FOR SUPPORTING AND GUIDING ENERGY CONVEYING CONDUCTORS

The present invention relates to an energy guiding chain for guiding energy conductors, especially cables or hoses, from a stationary point to a position varying consumer, said energy chain comprising divisible webs having at least two traverses and separating webs arranged there-between.

An arrangement is known for the feeding of means of consumption of various types through conductors to parts movable along certain paths. Such an arrangement comprises a supporting link chain with one or a plurality of continuous inner chambers for receiving conductors which are protected by the link chain toward the outside. The links of the link chain permit only a limited pivoting angle with regard to each other, the magnitude of which angle corresponds to the permissible bending radius of the most sensitive conductor.

There has furthermore become known an energy guiding chain with which the webs arranged between the link chains are divisible. With an energy conducting chain of this type, each web comprises at least two traverses, between which exchangeable spectacle-shaped parts divided vertically or horizontally and having bores are provided for receiving the energy conductor. With such an energy conducting chain it is possible to open the webs or the individual spectacle-shaped parts for the assembling of the energy conductor without the necessity of disassembling the link chain into its individual parts. The divisible webs used in this connection with the energy conducting chain have, however, a drawback in that their spatial shape or their structural connection is established only with their assembly on the link chains of the energy conducting chain. Therefore, it is not possible to effect a pre-assembly of the webs proper and to keep the same in stock in various sizes. A further drawback of the heretofore known divisible webs consists in that the weight of the inserted energy conductors has to be absorbed exclusively by the lower traverse which therefore is to be dimensioned correspondingly strong.

It is, therefore, an object of the present invention to provide an energy guiding chain with the divisible web which can be pre-assembled by itself and can be kept in stock and the carrying capability of which will be greatly improved. These and other objects and advantages of the invention will appear more clearly from the following specification in connection with the accompanying drawings, in which.

Figure 1:
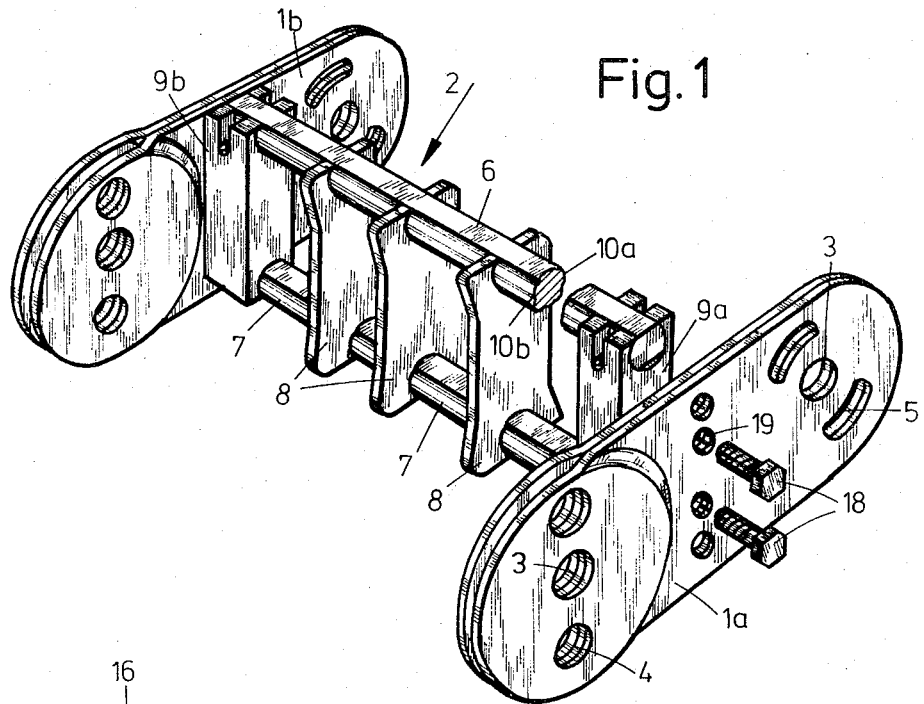
FIG. 1 illustrates an isometric view of a link of an energy guiding chain with a web according to the invention.

The energy guiding chain, according to the invention, for guiding energy conveying means, especially cables and hoses, from a fixed point to a position varying consumer, with the webs of said chain being divisible and comprising at least two traverses and separating webs therebetween, is characterized primarily in that the traverses have a flattened cross section with rounded narrow sides, and is furthermore characterized in that cutouts are provided in the separating webs at the upper and lower ends thereof, said cutouts having undercut sections. The energy guiding chain according to the invention is furthermore characterized in that the traverses, after insertion into the cutouts, are adapted by turning about their longitudinal axis to be connected to the separating webs in a positive and frictional manner.

According to a practical embodiment of the invention, the rounded narrow sides of the traverses may have a cross section in the form of circular segments of the same circle, while the recesses in the separating webs may likewise be circular, in which instance the diameter of the circle defining the circular segments of the traverses is slightly greater than the diameter of the circle describing the recesses in the separating webs. In this way, the traverses are, after insertion into the recesses, adapted to be braced with the separating webs in a positive and frictional manner when they are turned relative to said separating webs about their longitudinal axis by an angle of 90°. The connection between the traverses and the separating webs may be further improved by making the traverses of a stronger material, for instance metal, than the separating webs, which may consist of a somewhat more elastic material, for instance any suitable sythetic material.

The web which is pre-assembled of at least two traverses and a plurality of separating webs may already be connected to the traverses at the links of the energy guiding chain. This may be effected by screwing screws into the traverses from the outside through the links. According to a further development of the invention, head pieces are arranged at the ends of the traverses, which head pieces have undercut cutouts for insertion and connection of the traverses. The connection of the web pre-assembled in this manner to the links of the link chains forming the energy guiding chain is with this embodiment of the invention effected by a screw connection between the head pieces and the links of the link chains.

Since the webs have to be opened only on one side for assembling the energy conductors or conveying means, the head pieces may be firmly connected to the lower traverses by pins, clamping sleeves, or rivets. For a pull resistant connection of the upper detachable traverse, the head pieces are provided with grooves which are engaged by a pin inserted into the traverse.

The energy guiding chain with a web according to the invention has, above all, the advantage that, in addition to the links of the link chains, also the webs can be completely pre-assembled and can be kept in stock in different sizes. A further advantage consists in that, due to the positive and frictional connection between the separating webs and both traverses and the head pieces, grate construction is obtained with a considerably greater carrying ability than is the case with heretofore known divisible webs. Consequently, the individual parts of the webs may be dimensioned considerably weaker than was possible heretofore. The thus-obtained reduction in weight permits a greater unsupported length of the energy guiding chain. Still another advantage inherent to the present invention consists in that the adaptation of the size of the webs and the division of the separating webs to the various dimensions of the energy conductors is considerably simplified. The assembly of new, or exchange of, energy conductors is with the webs, according to the present invention, greatly simplified over heretofore known webs. This is due to the fact that, in view of the turning of one traverse by 90°, the web is already opened and thus the insertion of energy conductors is possible, and the heretofore customary time-consuming screwing operations will be eliminated.

Referring now to the drawings in detail; FIG. 1 shows a link structure of an energy guiding chain according to the invention which comprises two links 1a and 1b arranged parallel to each other, and also comprises web 2a fastened therebetween for receiving the non-illustrated energy guiding conductors. A plurality of links 1a and 1b may be connected for form a link chain. This may be effected by putting a plurality of links 1a and 1b together and inserting link bolts (not illustrated) into bores 3. The pivotal angle of the individual links 1a or 1b of a link chain relative to each other can be limited by means of bolts inserted into bores 4 and slots 5 respectively.

The web 2 according to the present invention comprises an upper traverse 6, a lower traverse 7, and a plurality of separating webs 8 arranged therebetween, and two head pieces 9a, 9b.

The traverses 6, 7 have a flat cross section and at their narrow sides have a circular segmental cross section. Both circular segments or circular sections 10a and 10b are located on the same circular arc.

Figure 2:
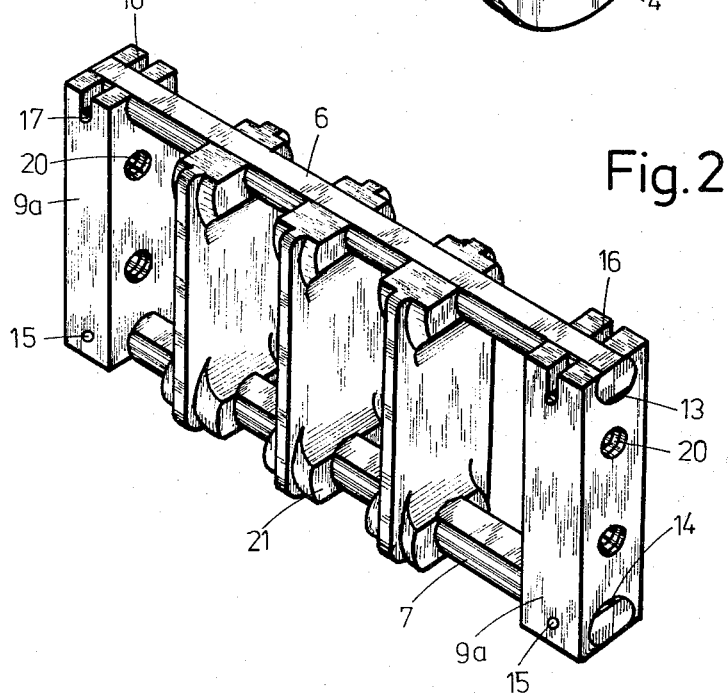
FIG. 2 is an isometric view of the web according to the invention.
Figure 3:
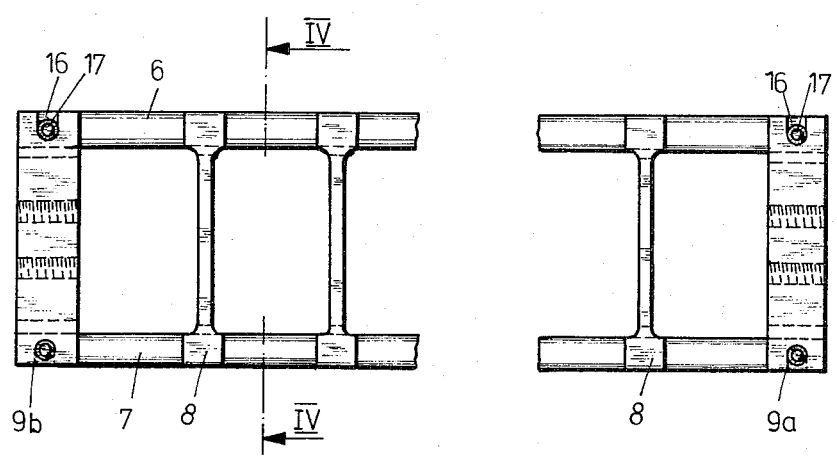
FIG. 3 shows a side view of the web of FIG. 2.
Figure 4:
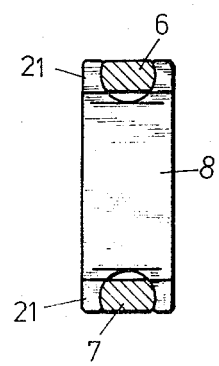
FIG. 4 represents a section taken along the line IV—IV of FIG. 3.
Figure 5:
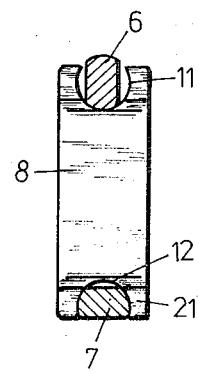
FIG. 5 shows a section taken along the line IV—IV of FIG. 3 with the upper traverse turned into assembling or disassembling position.

In the separating webs 8 and the head pieces 9a, 9b, at the upper and lower ends thereof, there are provided undercut recesses 11, 12 (FIG. 5) and 13, 14 (FIG. 2) which are chamfored at their outside. The recesses 11-14 have a circular cross section. The diameter of the recesses 11 – 14 is expediently slightly less than the diameter of the circular arc on which the circular sections 10a, 10b of the traverses 6, 7 are located, so that a frictional and positive fit can be obtained.

For purposes of mounting the webs 2, first the head pieces 9a, 9b are connected to the lower traverse 7. To this end, the lower traverse 7 is with a narrow side introduced into the lower recesses 14 of the head pieces 9a, 9b and is turned about its longitudinal axis by an angle of 90°. Inasmuch as one of the two traverses 6, 7 has no longer to be removed for the mounting of the energy conductors, the lower traverse 7 can, by means of pins 15, be secured in the head pieces 9a, 9b. Subsequently, the separating webs 8 are placed upon the lower traverse 7. The upper traverse 6 is then likewise with a narrow side inserted in downward direction into the upper recesses 11 and 13 of the separating webs 8 and head pieces 9a, 9b and is braced by turning by 90° about its longitudinal axis.

In order to make sure that also at the upper traverse 6 a pull resistant connection with the head pieces 9a, 9b is effected, the head pieces 9a, 9b are provided with grooves 16 engaged by a pin 17 inserted into the traverse 6.

The web 2, pre-assembled in this manner, is by means of screws 18 connected between the links 1a, 1b. The screws 18 extend through bores 19 in the links 1a, 1b into threaded bores 20 provided in the head pieces 9a, 9b.

For purposes of improving the frictional and positive connnection between the traverses 6, 7 and the separating webs 8, the separating webs 8 may at their upper and lower ends be provided with reinforcements 21.

It is, of course, to be understood that the present invention is by no means limited to the specific showing in the drawings, but also comprises any modifications within the scope of the appended claims.

What I claim is:

1. A link structure for use in chains for supporting energy conductors, especially cables and hoses, which includes: a first and a second link member arranged in spaced relationship and parallel to each other, a web arranged between and connected to said first and second link members while having its longitudinal extension substantially at a right angle with regard to the longitudinal extension of said first and second link members, said web comprising at least two traverse means arranged in substantially parallel and spaced relationship to each other and extending in the longitudinal direction of said web, at least one of said traverse means having two oppositely located rounded sections the contour of which corresponds to that of a cylinder and also having two oppositely located plane sides spaced from each other by a distance considerably less than the maximum distance between said rounded sections, a plurality of spacer webs respectively extending transverse to said traverse means and substantially parallel to each other while being spaced from each other in the longitudinal direction of said web, each of said spacer webs having two end portions at least one of which is provided with an undercut rounded coutout conforming in cross section to said rounded sections of said traverse means, at least one of said traverse means normally resting in said cutouts of said spacer webs and being non-removable therefrom when said rounded sections of said traverse means occupy a first position in the pertaining rounded cutouts of said spacer webs in which position said plane sides of said traverse means form a right angle with the distance line between said at least two traverse means, at least said one traverse means being rotatable from said first position into a second position angularly offset to said first position by about 90° for removal from the pertaining cutouts in said spacer webs, and locking means associated with said rotatable traverse means for preventing accidental turning thereof in the pertaining cutouts of said spacer webs.

2. A link structure according to claim 1, in which said cutouts in said spacer webs have an outwardly opening slot having a width narrower than the diameter of the rounded portion of each of said traverses but wider than the distance beween the plane sides of said traverses.

3. A link structure according to claim 1, in which said traverses are of metal and said spacer webs are of a synthetic material.

4. A link structure according to claim 3, in which said synthetic material is nylon.

5. A link structure according to claim 1, which includes head pieces respectively forming the ends of said web and respectively being connected to the respective adjacent link members each of said head pieces having end sections provided with a cutout substantially of the same contour as the cutouts of said spacer webs for respectively receiving the end portions of said traverses, and pin means forming said locking means and respectively detachably extending through said head pieces in a direction transverse to the longitudinal direction of said traverses and closely below the lower plane side of the respective adjacent traverse, thereby preventing turning of the latter.

6. A link structure according to claim 5, in which said head pieces are provided with grooves for receiving and guiding said pin means.

7. A link structure according to claim 5, in which one of said traverse means is fixedly connected to said head pieces.

8. A link structure according to claim 5, in which said head pieces are provided with threaded bores, and in which threaded connecting bolts extend through said link members into said threaded bores while connecting said link members to said head pieces.

9. A link structure according to claim 1, in which said spacer webs are reinforced within the region of the rounded cutouts therein.

* * * * *

UNITED STATES PATENT OFFICE
CERTIFICATE OF CORRECTION

Patent No. 3,848,407　　　　　　Dated November 19, 1974

Inventor(s) Werner Moritz

It is certified that error appears in the above-identified patent and that said Letters Patent are hereby corrected as shown below:

Item [73] "Kobelschlepp" should read -- Kabelschlepp --.

Signed and sealed this 18th day of February 1975.

(SEAL)
Attest:

RUTH C. MASON
Attesting Officer

C. MARSHALL DANN
Commissioner of Patents
and Trademarks